(12) United States Patent
Haverstick

(10) Patent No.: US 6,419,712 B1
(45) Date of Patent: Jul. 16, 2002

(54) LITHIUM POLYMER CONSISTENT LAMINATION PROCESS

(75) Inventor: Jerry Edward Haverstick, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/567,968

(22) Filed: May 10, 2000

(51) Int. Cl.[7] .............................................. H01M 10/38
(52) U.S. Cl. ...................................... 29/623.5; 29/623.1
(58) Field of Search ........................... 29/623.1, 623.2, 29/623.3, 623.4, 623.5

(56) References Cited

U.S. PATENT DOCUMENTS

| | | | |
|---|---|---|---|
| 4,477,545 A | * 10/1984 | Akridge et al. | 429/191 |
| 4,865,932 A | * 9/1989 | Masuda et al. | 429/194 |
| 5,358,658 A | 10/1994 | Pradhan et al. | 252/62.2 |
| 5,449,574 A | * 9/1995 | Higley | 429/152 |
| 5,587,257 A | 12/1996 | Tibbetts et al. | 429/218 |
| 5,604,057 A | 2/1997 | Narzi | 429/224 |
| 5,674,644 A | 10/1997 | Nazri | 429/224 |
| 5,743,921 A | 4/1998 | Nazri et al. | 29/623.5 |
| 5,871,865 A | 2/1999 | Barker et al. | 429/223 |
| 5,916,515 A | 6/1999 | Bryan et al. | 29/623.3 |
| 5,961,671 A | 10/1999 | Guindy et al. | 29/623.1 |

OTHER PUBLICATIONS

Kuller et al, "EnV'98 Energy Storage Devices—Latest Realities Lithium Polymer Batteries for Electric Vehicles," Minnesota Mining and Manufacturing (3M) No Month.

* cited by examiner

*Primary Examiner*—Carol Chaney
(74) *Attorney, Agent, or Firm*—Margaret A. Dabrowitsky

(57) ABSTRACT

A battery, more specifically a battery cell for a lithium polymer battery, is made using a method that includes the lamination step of applying isostatic pressure to battery cell components. The method further includes the step of heating the components of the battery cell at least prior to the step of applying isostatic pressure. The components of the battery cell should also include a binder material that includes a polymer that softens when heated, thus allowing the components named above to laminate.

19 Claims, 2 Drawing Sheets

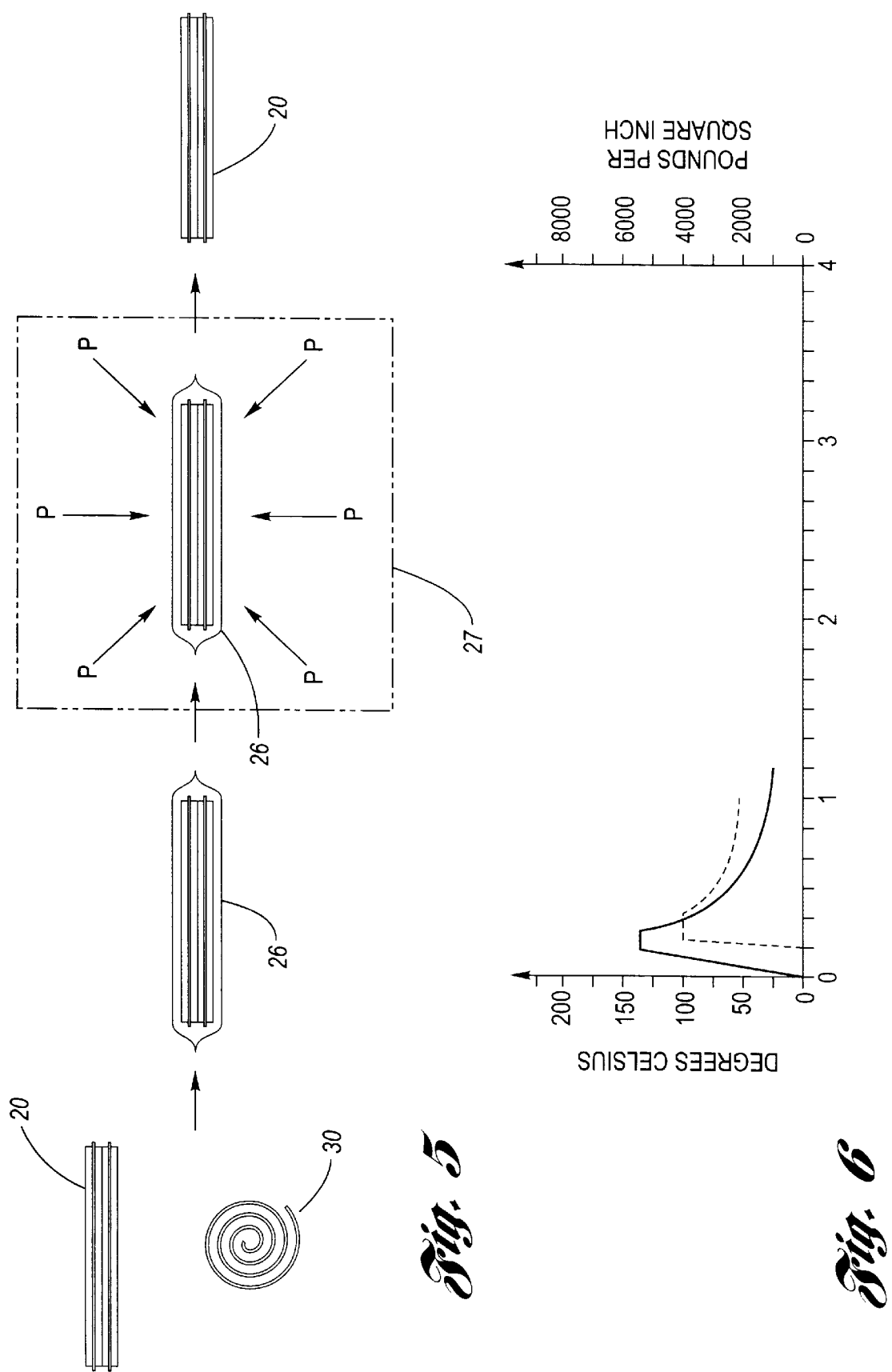

LITHIUM POLYMER CONSISTENT LAMINATION PROCESS

FIELD OF THE INVENTION

The present invention relates to the field of battery manufacturing. More particularly, the present invention relates to the field of lithium polymer battery manufacturing.

BACKGROUND OF THE INVENTION

Lithium polymer batteries are commonly manufactured using processes that incorporate the use of both heat and pressure to laminate layers of anodes, cathodes, and separators into a cell construction. Lamination can be performed by either of two well-recognized methods. One of the methods is commonly referred to as flat plate manufacture, and is performed using the components shown in FIG. 1. Using the flat plate manufacturing process, a load is applied onto two heated plates 10, where the cell assembly materials 11 are sandwiched between the plates 10. The other of the two recognized methods is commonly referred to as roller lamination manufacture, and is shown in FIG. 2. Using the roller lamination process, two heated rotating rollers 12 apply pressure to the cell assembly materials 11 as the materials 11 are pinched together while passing through a set gap between the rollers 12.

The roller lamination process and the flat plate lamination process are limited in the types of battery cells that they are able to construct. Because the pressure is applied uniaxially in either process, only a flat cell construction can be formed thereby.

Furthermore, using the existing roller and flat plate machinery, cells are constructed one at a time and then stacked together to give the desired application specific capacity. For example, if forty-five cells are stacked together, which is the maximum-sized stack using current processes, then forty-five individual lamination steps are required to make one cell.

Another problem associated with current battery cell manufacturing technology is that when the pieces are manufactured individually, they qualitatively vary. Using flat plate and roller lamination it is almost impossible to maintain consistent pressure across the entire cell. Inconsistent pressure contributes to short cell life and to poor performance of the battery. Using a flat plate manufacturing process, it is very difficult to maintain perfect parallelism between the two plates, especially with large plates. Using roller lamination, the slightest out of roundness of either roller translates to uneven pressure on the cell.

There is therefore an existing need for a battery cell manufacturing process that allows for the simultaneous manufacture of a large number of cells and enables consistent quality among the cells and within the cell layers. There is also an existing need for a manufacturing process that can be adapted for production of cells having a shape other than the flat prismatic construction.

SUMMARY OF THE INVENTION

It is an object of the present invention to meet the above-described needs and others. Specifically, it is an object of the present invention to provide a battery, more specifically a battery cell, and a method for manufacturing such. The method includes the steps of providing battery cell components such as a cathode, an anode, a separator disposed between the anode and the cathode, a cathode grid, and an anode grid, and applying isostatic pressure to the battery cell components. The isostatic pressure is applied using a hot isostatic press (HIP).

The method should further include the step of heating the components of the battery cell at least prior to the step of applying isostatic pressure. preferably, heating is performed while pressure is being applied.

The components of the battery cell should also include a binder material that includes a polymer that softens when heated, thus allowing the components named above to laminate. The binder material includes polyvinylidene fluoride, polymethylmethacrylate, polyvinylidene fluoride copolymer, polyacrylonitrile, and/or polyvinylchloride.

In a HIP, it is important to remove air from the surroundings of the cell components prior to adding heat and pressure. Accordingly, the method includes the step of wrapping the cell components in a heat-sealable film. Before sealing the film, a vacuum removes air and any other gases from the inside of the film.

The battery cell can be a flat prismatic cell. However, because isostatic pressure is applied instead of uniaxial pressure, cells of any conceivable structure can be manufactured. For example, the anode and the cathode can be spirally wound to form the wound cell, or round cell construction, prior to being subjected to isostatic pressure. The battery cell produced using the lamination method of the present invention is most preferably a component of a lithium polymer battery.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as

BRIEF DESCRIPTION OF THE DRAWINGS

The accompanying drawings illustrate the present invention and are a part of the specification. Together with the following description, the drawings demonstrate and explain the principles of the present invention.

FIG. 5 is a flow chart that displays the steps of the process of the present invention.

FIG. 6 is a graphical representation of an example of heat and pressure application steps of the process of the present invention.

DETAILED DESCRIPTION OF THE PREFERRED EMBODIMENTS

Using the drawings, the preferred embodiments of the present invention will now be explained.

Figure 1:
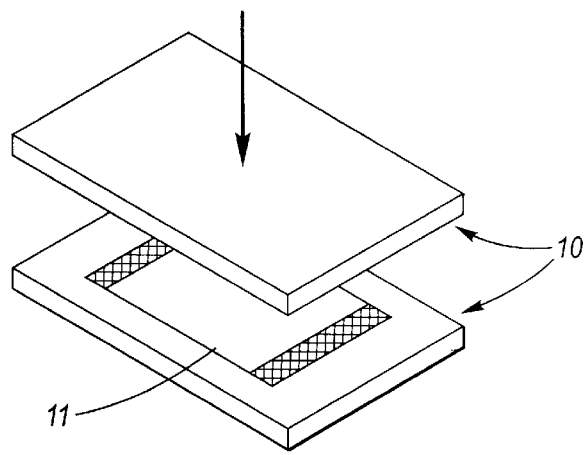
FIG. 1 shows flat lamination plates used in related lamination processes.
Figure 2:
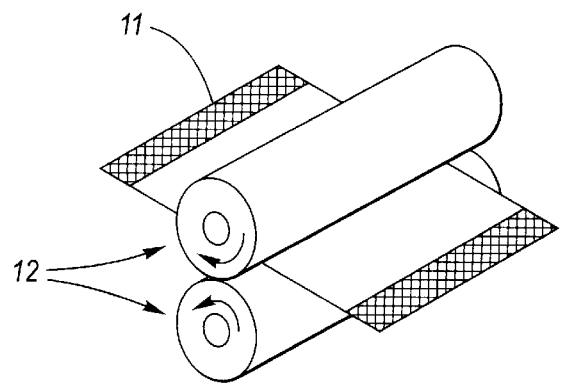
FIG. 2 shows pinch rollers used in related lamination processes.
Figure 3:
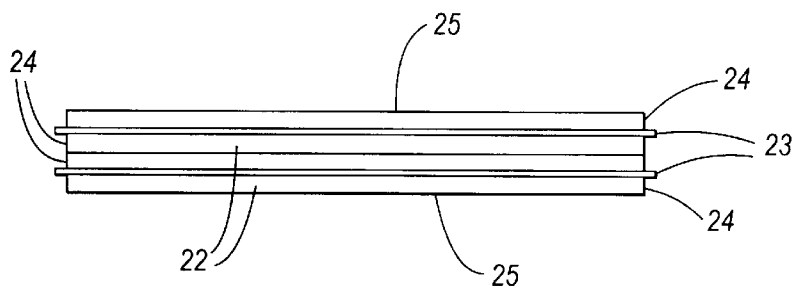
FIG. 3 shows a prismatic cell that is assembled in accordance with the present invention.

First, the manufacture of a flat prismatic bicell will be described. FIG. 3 shows a flat prismatic bicell 20 of the present invention, and the bicell 20 is of the construction that may be used for a lithium polymer battery, among other types of batteries. The flat prismatic bicell 20 includes several films including films of material that makes up anodes 21, films of material that makes up cathodes 22, and separator films 23. A cathode grid 24 or other current collector is provided between the cathodes 22, and an anode grid 25 or other suitable current collector is provided about the exterior of the cell 20, and in contact with each of the anodes 21. The cathode grid 24 is typically made of aluminum or other suitable metal or metal alloy. The anode grid 25 is typically made of copper or other suitable metal alloy.

Figure 4:
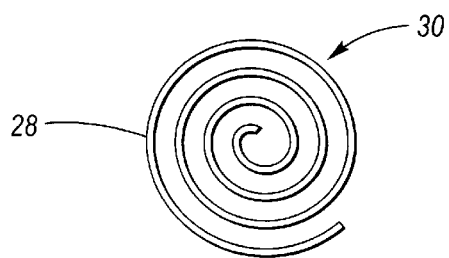
FIG. 4 shows a cathode as it is wound in a wound cell of a battery of the present invention.

FIG. 4 shows the general idea for a spirally wound cell 30 that is manufactured according to the present invention. Although only a wound cathode 28 is shown in the drawing, the wound cell 30 also contains a cathode, and anode and cathode grids that are separated by separator films, and wound the same way as the cathode 28. The anode and cathode grids are provided to collect the current. The spirally wound cell is shown as an example of cell constructions that can be manufactured using the principles of the present invention. Other constructions, having varieties of shapes and sized according to need can be manufactured using a process as described herein. While there is a volumetric efficiency improvement with the above-described flat prismatic bicells 20, cylindrical or round batteries that include the wound cell 30 have distinct advantages. The established art of winding cells lends itself to high volume production with a reduced manufacturing due to the limited number of parts used to make the cells. Another advantage associated with the manufacture of round batteries lies in the fact that many if not most electrical applications use round batteries, and are molded to hold and receive current from the specially shaped batteries.

With either the flat prismatic bicell 20 or the sprially wound cell 30, a generally known binder is added to the anode 21, cathode 22, and separator 23 films. The binder is normally made of a rigid material at room temperature that becomes soft when heated. The binder material preferably includes a polymer that softens when heated, thus allowing the anode film, the cathode film, the separator films, and the anode and cathode grids to bond to each other. The bonding is commonly referred to as lamination. The binder material includes polyvinylidene fluoride, polymethylmethacrylate, polyvinylidene fluoride copolymer, polyacrylonitrile, and/or polyvinylchloride. If pressure is applied to the cell 20 while the binder is softened, the anode 21, cathode 22, and separator 23 films will bond to each other, and to the cathode grid 24 and anode grid 25 as well.

FIG. 5 is a flow chart that generally displays the process of the present invention. At step 31, at least one cell, with all of its constituents included as described above, is introduced for pressing. While the cell shown to proceed through the flow chart is of the flat prismatic construction 20, the wound cell 30 or a cell of any construction can be processed under the principles of the present invention. The flat prismatic bicells 20 or other types of cells may be stacked or otherwise arranged to achieve maximum efficiency.

At step 32, the cells are packaged in a heat sealable film 26. The film 26 is preferably vacuum formed around the cells to remove all air.

After the cells are sealed with the film 26, they are introduced into a hot isostatic pressure press (HIP) 27 where they are subjected to increased temperature and pressure, represented as steps 33 and 34 in FIG. 5. The laminated cells are then removed from the HIP and the foil is removed, shown generally as step 35.

Pressing using a HIP provides a distinct advantage where, unlike pressing using rollers or flat plates, intricate shaped articles can be subjected to high pressure without becoming deformed, since pressure is uniformly distributed about the articles. Using the HIP, a medium such as water, oil, or nitrogen, for example, is uniformly compressed in every direction around an article regardless of the article's shape. Utilizing the HIP ensures even and consistent heat and pressure, thereby optimizing the lamination of cells whether they be wound cells, flat prismatic bicells, or other types of cells that require laminating.

An example of the lamination process of the present invention will now be described. A flat prismatic bicell for a lithium polymer battery, and that included the components described above, was vacuum wrapped in a foil film and introduced into a HIP. The conditions within the HIP are graphically shown in FIG. 6. The temperature within the HIP was raised from room temperature to 130° C. over 10 minutes. The HIP remained heated to that temperature for five minutes. At the end of the ten-minute temperature ramp, the pressure in the HIP was raised to 4000 lbs/in$^2$ over one minute. The HIP remained pressurized for approximately ten minutes. At the end of the hold periods, the temperature and pressure were allowed to drop to surrounding conditions. Upon cooling, the laminated cells were removed from the HIP for further processing.

Using the method of the present invention, with the uniform pressure associated with hot isostatic pressing, the lamination interface between the cell components is greatly improved in terms of quality and completeness. The isostatic pressure provides consistent and uniform lamination of the cell components. Furthermore, lamination of a complete cell instead of individual cell components can be accomplished using the method, which greatly reduces the battery manufacturing costs.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method for manufacturing a battery cell, which comprises the steps of:

providing components of said battery cell, comprising a cathode, an anode, a separator disposed between said anode and said cathode, a cathode grid, and an anode grid; and applying pressure to said components of said battery cell, wherein said method is characterized in that said step of applying pressure comprises applying isostatic pressure of less than 10,000 lbs/in$^2$ while said components of said battery cell are enclosed in a hot isostatic press.

2. The method of claim 1, which further comprises the step of heating said components of said battery cell at least prior to said step of applying isostatic pressure.

3. A method for manufacturing a battery cell, which comprises the steps of:

providing components of said battery cell, comprising a cathode, an anode, a separator disposed between said anode and said cathode, a cathode grid, and an anode grid;

applying pressure to said components of said battery cell, wherein said method is characterized in that said step of applying pressure comprises applying isostatic pressure; and heating said components of said battery cell at least prior to said step of applying isostatic pressure, wherein said components of said battery cell further comprise binder material that softens when said heating step is performed.

4. The method of claim 3, wherein said binder material comprises at least one of polyvinylidene fluoride, polymethylmethacrylate, polyvinylidene fluoride copolymer, polyacrylonitrile, and polyvinylchloride.

5. The method of claim 2, wherein said step of heating is performed while said step of applying pressure is being performed.

6. The method of claim 1, which further comprises the steps of:

wrapping said components of said battery cell in a heat-sealable film; and vacuum sealing said components inside said film.

7. The method of claim 1, wherein said battery cell is a flat prismatic cell.

8. The method of claim 1, wherein said anode and said cathode are spirally wound prior to said step of applying pressure.

9. The method of claim 1, wherein said battery cell is a component of a lithium polymer battery.

10. A battery that comprises a battery cell made by the method of claim 1.

11. A battery that comprises a battery cell made by the method of claim 2.

12. A method for manufacturing a lithium polymer battery, which comprises the steps of:

providing components of a battery cell, comprising a cathode, an anode, a separator disposed between said anode and said cathode, a cathode grid, and an anode grid; and applying pressure to said components of said battery cell, wherein said method is characterized in that said step of applying pressure comprises applying isostatic pressure of less than 10,000 lbs/in$^2$ while said components of said battery cell are enclosed in a hot isostatic press.

13. The method of claim 12, which further comprises the step of heating said components of said battery cell at least prior to said step of applying isostatic pressure.

14. A method for manufacturing a lithium polymer battery, which comprises the steps of:

providing components of said battery cell, comprising a cathode, an anode, a separator disposed between said anode and said cathode, a cathode grid, and an anode grid;

applying pressure to said components of said battery cell, wherein said method is characterized in that said step of applying pressure comprises applying isostatic pressure; and heating said components of said battery cell at least prior to said step of applying isostatic pressure, wherein said components of said battery cell further comprise binder material that softens when said heating step is performed.

15. The method of claim 14, wherein said binder material comprises at least one of polyvinylidene fluoride, polymethylmethacrylate, polyvinylidene fluoride copolymer, polyacrylonitrile, and polyvinylchloride.

16. The method of claim 13, wherein said step of heating is performed while said step of applying pressure is being performed.

17. The method of claim 12, which further comprises the steps of:

wrapping said components of said battery cell in a heat-sealable film; and vacuum sealing said components inside said film.

18. The method of claim 12, wherein said battery cell is a flat prismatic cell.

19. A method for manufacturing a lithium polymer battery, which comprises the steps of:

providing components of said battery cell, comprising a cathode, an anode, a separator disposed between said anode and said cathode, a cathode grid, and an anode grid;

applying pressure to said components of said battery cell, wherein said method is characterized in that said step of applying pressure comprises applying isostatic pressure, wherein said anode and said cathode are spirally wound prior to said step of applying pressure.

* * * * *